United States Patent [19]
Stevenson et al.

[11] Patent Number: 6,081,552
[45] Date of Patent: Jun. 27, 2000

[54] VIDEO CODING USING A MAXIMUM A POSTERIORI LOOP FILTER

[75] Inventors: Robert L. Stevenson, Granger, Ind.; Thomas R. Gardos, Portland, Oreg.

[73] Assignee: Intel Corporation, Santa Clara, Calif.

[21] Appl. No.: 09/006,249

[22] Filed: Jan. 13, 1998

[51] Int. Cl.[7] .................................................. H04N 7/50
[52] U.S. Cl. .................... 375/240; 348/405; 358/463; 375/245; 375/254; 382/275
[58] Field of Search .................... 375/240, 245, 375/254; 348/405; 358/463; 382/275

[56] References Cited

U.S. PATENT DOCUMENTS

| | | | |
|---|---|---|---|
| 4,918,633 | 4/1990 | Sullivan | 375/245 |
| 5,461,422 | 10/1995 | Hsieh | 348/405 |
| 5,636,295 | 6/1997 | Kim | 348/405 |
| 5,818,964 | 10/1998 | Itoh | 382/275 |
| 5,974,197 | 10/1999 | Lee | 382/268 |

*Primary Examiner*—Howard Britton
*Attorney, Agent, or Firm*—Duane, Morris & Heckscher LLP

[57] ABSTRACT

A maximum a posteriori (MAP) filter is applied as a loop filter during encode/decode processing to generate filtered data used to encode/decode other data. In one embodiment, the MAP filter is applied iteratively to a decoded frame to generate the resulting filtered frame. When applied as a loop filter, the filtered frame is used to generate reference data used to encode or decode one or more other video frames.

14 Claims, 5 Drawing Sheets

VIDEO CODING USING A MAXIMUM A POSTERIORI LOOP FILTER

BACKGROUND OF THE INVENTION

1. Field of the Invention

The present invention relates to image processing, and, in particular, to compression and decompression of video data.

2. Description of the Related Art

Many video compression algorithms employ a quantization stage where the video picture information is stored with reduced precision. The effect of the quantization is to add what is referred to as quantization noise to the reconstructed video. When quantization is part of a block transform-based video encoding scheme, the quantization noise often appears as undesirable blockiness in the decoded images.

The present invention is directed to a scheme for reducing the quantization noise effects associated with video encoding schemes that perform quantization.

Further objects and advantages of this invention will become apparent from the detailed description of a preferred embodiment which follows.

SUMMARY OF THE INVENTION

The present invention is directed to the encoding of video signals. A first video image is encoded to generate a first encoded video image and the first encoded video image is decoded to generate a first decoded video image. A maximum a posteriori (MAP) filter is applied to the first decoded video image to generate a first filtered video image and a second video image is encoded based on the first filtered video image to generate a second encoded video image.

The present invention is also directed to the decoding of encoded video signals. A first encoded video image is decoded to generate a first decoded video image. A MAP filter is applied to the first decoded video image to generate a first filtered video image and a second encoded video image is decoded based on the first filtered video image to generate a second decoded video image.

BRIEF DESCRIPTION OF THE DRAWINGS

Other objects, features, and advantages of the present invention will become more fully apparent from the following detailed description of the preferred embodiment, the appended claims, and the accompanying drawings in which:

DESCRIPTION OF THE PREFERRED EMBODIMENT(S)

The present invention relates to video coding in which a maximum a posteriori (MAP) filter is applied as a loop filter during video encoding/decoding operations. A MAP filter is a filter that attempts to maximize the probability that the filtered output is the closest to the original image data for the provided compressed data, given certain assumptions about what the data should look like. For further information of MAP estimation and for further description of the application of MAP filters during image encoding can be found in Thomas P. O'Rourke and Robert L. Stevenson, "Improved Image Decompression for Reduced Transform Coding Artifacts," IEEE Transactions on Circuits and Systems for Video Technology, Vol. 5, No. 6, December 1995, pp. 490–499, which is incorporated herein by reference and referred to herein as "the IEEE paper."

A loop filter is a filter that is applied inside the encoding or decoding loop. In an encoder, a filter is a loop filter if the output of the filter is used to form reference data used to encode other input data. Similarly, in a decoder, a filter is a loop filter if the output of the filter is used to form reference data used to decode other encoded input data. A loop filter differs from a post filter whose output is not used to form reference data for either encoding or decoding other input data. Typically, post filters are applied only during decode processing.

System Hardware Architectures

Figure 1:
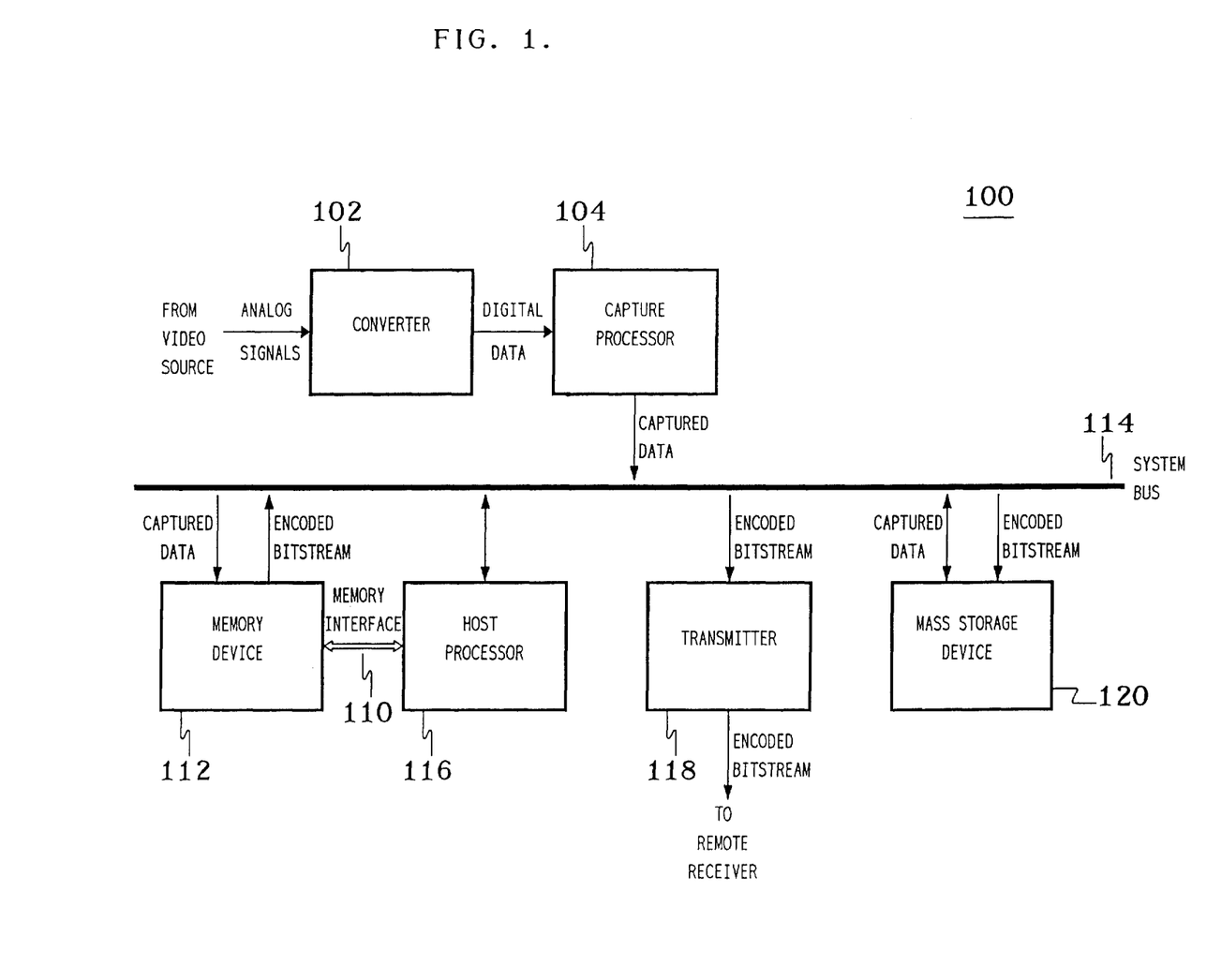
FIG. 1 is a block diagram illustrating a computer system for encoding video signals, according to one embodiment of the present invention.

Referring now to FIG. 1, there is shown a block diagram illustrating computer system 100 for encoding video signals, according to one embodiment of the present invention. Analog-to-digital (A/D) converter 102 of encoding system 100 receives analog video signals from a video source. The video source may be any suitable source of analog video signals such as a video camera or VCR for generating local analog video signals or a video cable or antenna for receiving analog video signals from a remote source. Converter 102 separates the analog video signal into constituent components and digitizes the analog components into digital video component data (e.g., 24-bit RGB component data).

Capture processor 104 captures the digital 3-component video data received from converter 102. Capturing may include one or more of color conversion (e.g., RGB to YUV), scaling, and subsampling. Each captured video frame is represented by a set of three two-dimensional component planes, one for each component of the digital video data. In one embodiment, capture processor 104 captures video data in a YUV9 (i.e., YUV 4:1:0) format, in which every (4×4) block of pixels of the Y-component plane corresponds to a single pixel in the U-component plane and a single pixel in the V-component plane. Capture processor 104 selectively stores the captured data to memory device 112 and/or mass storage device 120 via system bus 114. Those skilled in the art will understand that, for real-time encoding, the captured data may be stored to memory device 112, while for non-real-time encoding, the captured data may be stored to mass storage device 120. For non-real-time encoding, the captured data will subsequently be retrieved from mass storage device 120 and stored in memory device 112 for encode processing by host processor 116.

During encoding, host processor 116 reads the captured bitmaps from memory device 112 via high-speed memory interface 110 and generates an encoded video bitstream that represents the captured video data. Depending upon the particular encoding scheme implemented, host processor 116 applies a sequence of compression steps to reduce the amount of data used to represent the information in the video images. The resulting encoded video bitstream is then stored to memory device 112 via memory interface 110. Host processor 116 may copy the encoded video bitstream to mass storage device 120 for future playback and/or transmit the encoded video bitstream to transmitter 118 for real-time transmission to a remote receiver (not shown in FIG. 1).

Figure 2:
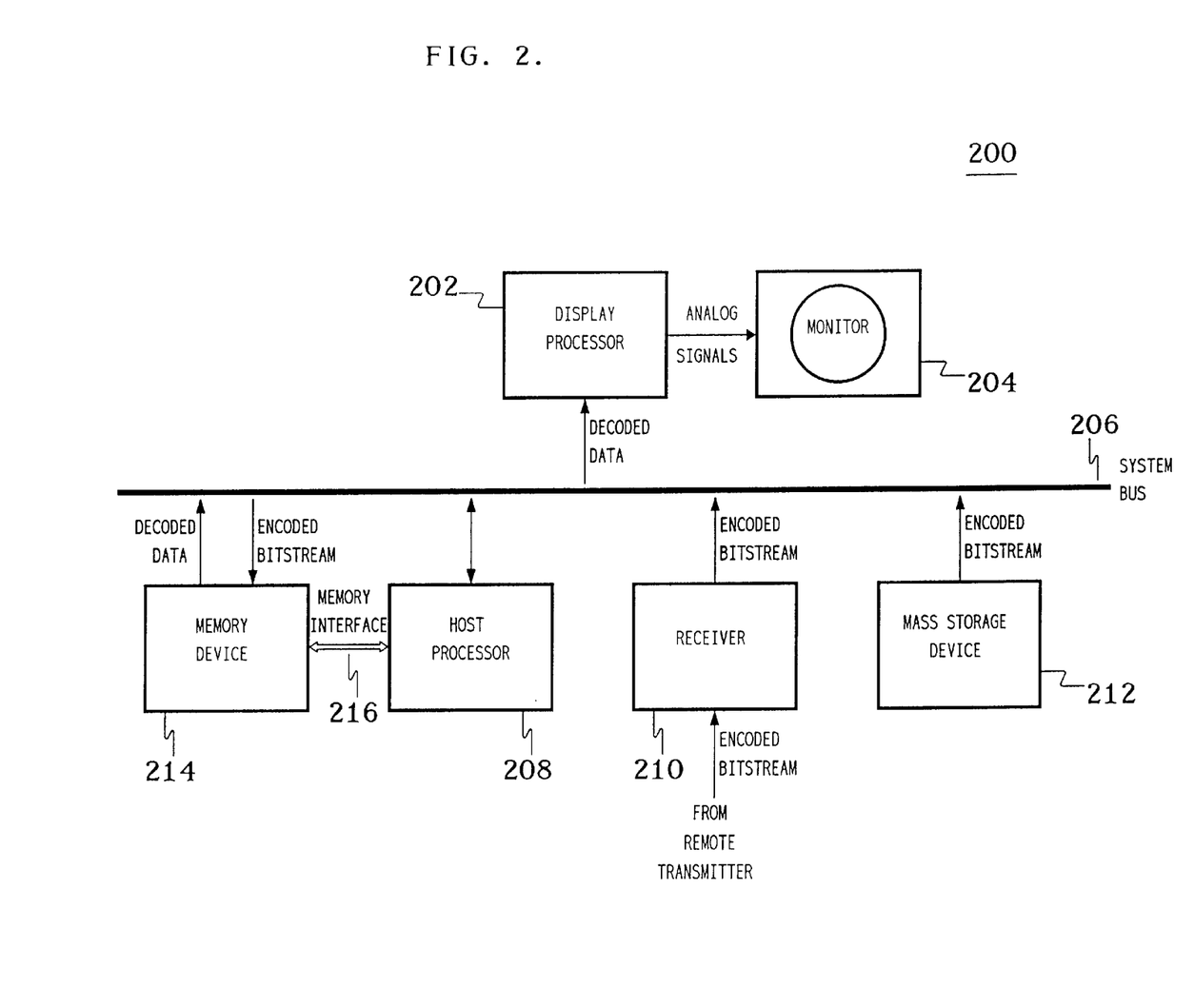
FIG. 2 is a block diagram illustrating a computer system for decoding the video signals generated by the computer system of FIG. 1, according to one embodiment of the present invention.

Referring now to FIG. 2, there is shown a block diagram illustrating computer system 200 for decoding the encoded video bitstream generated by encoding system 100 of FIG. 1, according to one embodiment of the present invention. The encoded video bitstream is either read from mass storage device 212 of decoding system 200 or received by receiver 210 from a remote transmitter, such as transmitter 118 of FIG. 1. The encoded video bitstream is stored to memory device 214 via system bus 206.

Host processor 208 accesses the encoded video bitstream stored in memory device 214 via high-speed memory interface 216 and decodes the encoded video bitstream for display. Decoding the encoded video bitstream involves undoing the compression processing implemented by encoding system 100 of FIG. 1. Host processor 208 stores the resulting decoded video data to memory device 214 via memory interface 216 from where the decoded video data are transmitted to display processor 202 via system bus 206. Alternatively, host processor 208 transmits the decoded video data directly to display processor 202 via system bus 206. Display processor 202 processes the decoded video data for display on monitor 204. The processing of display processor 202 includes digital-to-analog conversion of the decoded video data. After being decoded by host processor 208 but before being D/A converted by display processor 202, the decoded video data may be upsampled (e.g., from YUV9 to YUV24), scaled, and/or color converted (e.g., from YUV24 to RGB24). Depending upon the particular embodiment, each of these processing steps may be implemented by either host processor 208 or display processor 202.

Referring again to FIG. 1, encoding system 100 may be a processor-based personal computer (PC) system with a special purpose video-processing plug-in board. In particular, converter 102 may be any suitable means for decomposing and digitizing analog video signals. Capture processor 104 may be any suitable processor for capturing digital video component data as subsampled frames. In one embodiment, converter 102 and capture processor 104 are contained in a single plug-in board capable of being added to a processor-based PC system.

Host processor 116 may be any suitable means for controlling the operations of the special-purpose video processing board and for performing video encoding. Host processor 116 may be a general-purpose processor manufactured by Intel Corporation, such as a Pentium® processor or Pentium® Pro processor. System bus 114 may be any suitable digital signal transfer medium such as a peripheral component interconnect (PCI) bus. Memory device 112 may be any suitable computer memory device such as one or more dynamic random access memory (DRAM) devices. High-speed memory interface 110 may be any suitable means for interfacing between memory device 112 and host processor 116. Mass storage device 120 may be any suitable means for storing digital data such as a computer hard drive. Transmitter 118 may be any suitable means for transmitting digital data to a remote receiver such as a modem. Those skilled in the art will understand that the encoded video bitstream may be transmitted using any suitable means of transmission such as telephone line, RF antenna, local area network, or wide area network.

Referring again to FIG. 2, decoding system 200 may be a processor-based PC system similar to the basic PC system of encoding system 100. In particular, host processor 208 may be any suitable means for decoding an encoded video bitstream such as a general purpose processor manufactured by Intel Corporation, such as a Pentium® processor or Pentium® Pro processor. System bus 206 may be any suitable digital data transfer medium such as a PCI bus. Mass storage device 212 may be any suitable means for storing digital data such as a CD-ROM device or a hard drive. Receiver 210 may be any suitable means for receiving the digital data transmitted by transmitter 118 of encoding system 100 such as a modem. Display processor 202 and monitor 204 may be any suitable devices for processing and displaying video images (including the conversion of digital video data to analog video signals) and may be parts of a PC-based display system having a PCI 24-bit graphics board and an RGB monitor.

In one embodiment, encoding system 100 of FIG. 1 and decoding system 200 of FIG. 2 are two distinct computer systems. In another embodiment of the present invention, a single computer system comprising all of the different components of systems 100 and 200 may be used to encode and decode video images. Those skilled in the art will understand that such a combined system may be used to display decoded video images in real-time to monitor the capture and encoding of the video stream.

In alternative embodiments in accordance with the present invention, the video encode processing of an encoding system and/or the video decode processing of a decoding system may be assisted by a pixel processor or other suitable component(s) to off-load processing from the host processor by performing computationally intensive operations.

Software Architecture for Video Encoding

Figure 3:
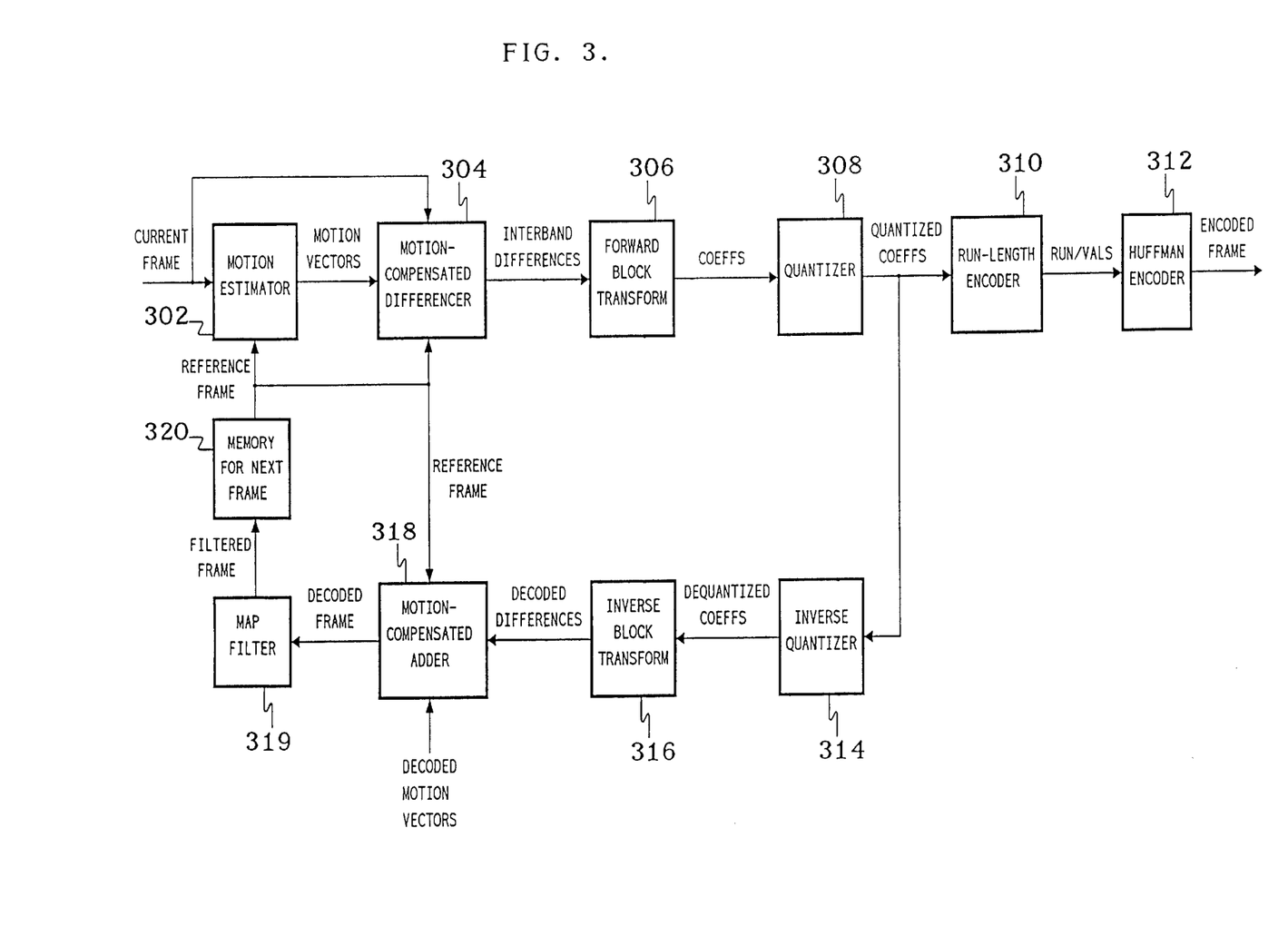
FIG. 3 is a block diagram illustrating the software architecture for the video encoding processing implemented on the host processor of the encoding system of FIG. 1.

Referring now to FIG. 3, there is shown a block diagram illustrating the software architecture for the video encoding processing implemented on host processor 116 of encoding system 100 of FIG. 1, according to one embodiment of the present invention. FIG. 3 shows interframe encoding for a frame of data. Those skilled in the art will understand that, in a video codec that employs interframe encoding, some of the frames may be encoded using only intraframe encoding. It will be further understood that each block of an interframe encoded frame may be encoded as either an intra block (i.e, using intraframe encoding) or a difference block (i.e., using interframe encoding). The encoding of intra blocks is equivalent to the encoding of difference blocks shown in FIG. 3, except that the motion estimation of 302 and the motion-compensated differencing of 304 are not performed.

For interframe encoding, motion estimator 302 of FIG. 3 performs motion estimation on macroblocks of the current frame relative to a reference frame to generate a set of motion vectors for the current frame. Motion-compensated differencer 304 applies the appropriate motion vectors to the reference frame to generate a motion-compensated prediction frame. Differencer 304 also generates interframe differences for the current frame using the motion-compensated prediction frame and the current frame.

A forward block transform 306 (e.g., a DCT or slant transform) is applied to each block to generate coefficients for the current frame. Quantizer 308 quantizes the coefficients to generate quantized coefficients for the current frame. Run-length encoder 310 transforms the quantized coefficients into run-length encoded (RLE) data. In one embodiment, the RLE data for each block of quantized coefficients consist of a sequence of codes corresponding to run/val pairs, where each run/val pair is a value corresponding to a run of zero coefficients (i.e., coefficients that are quantized to zero) followed by a non-zero quantized coefficient. The run-length encoding may follow an adaptively-generated pattern that tends to provide a long run of zero coefficients for the last run of the block. Huffman encoder 312 applies Huffman-type entropy (a.k.a. statistical or variable-length) coding to the RLE data to generate the encoded block data for the current frame.

The encode processing of FIG. 3 also includes the decoding of the encoded frame to update the reference frame used in encoding another video frame. Since the run-length and Huffman encoding are lossless encoding steps, the decode loop of the encode processing begins at inverse quantizer 314, which dequantizes the quantized coefficients to generate dequantized coefficients for the current frame. Inverse block transform 316 applies the inverse of forward block transform 306 to the dequantized coefficients to generate decoded differences for the current frame. Motion-compensated adder 318 applies decoded motion vectors (generated by decoding the encoded motion vectors for the current frame) to the current reference frame (stored in memory 320) to generate motion-compensated prediction frame data. Adder 318 also performs interframe addition using the motion-compensated prediction frame data and the decoded differences to generate a decoded frame.

Filter 319 applies a MAP filter to the decoded frame to generate a filtered frame. Filter 319 is considered to be a loop filter because it is applied as part of the decode path of the encoding loop. The output of filter 319 (i.e., the filtered frame) is stored in memory 320 and is used to form the reference frame used to encode one or more other video frames. MAP filter 319 is described in further detail later in this specification in the section entitled "MAP Filter."

Software Architecture for Video Decoding

Figure 4:
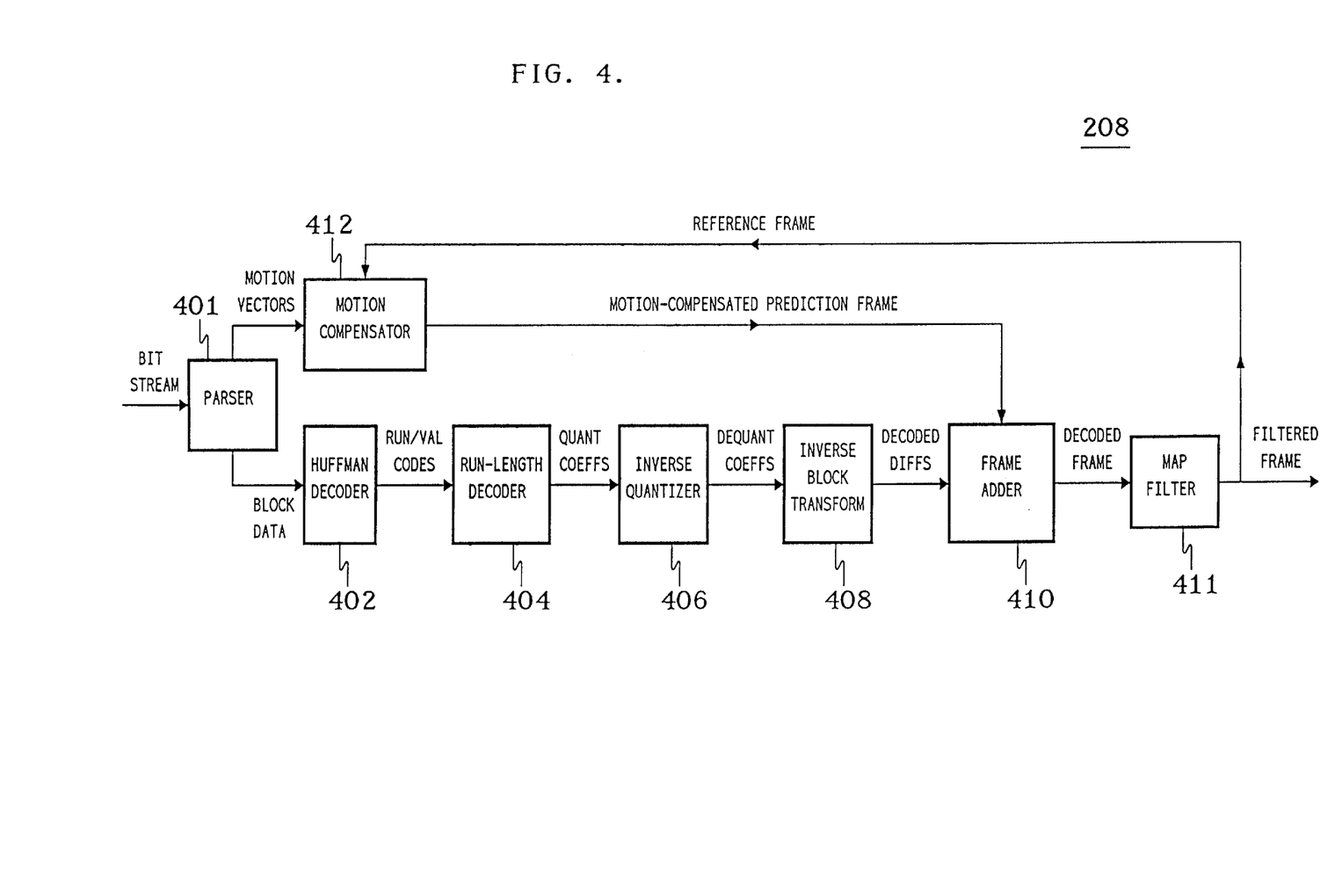
FIG. 4 is a block diagram illustrating the software architecture for the video decoding processing implemented on the host processor of the decoding system of FIG. 2.

Referring now to FIG. 4, there is shown a block diagram illustrating the software architecture for the video decoding processing implemented on host processor 208 of decoding system 200 of FIG. 2, according to one embodiment of the present invention. The decode processing of FIG. 4 reverses the encode processing of FIG. 3. As such, FIG. 4 shows the decoding of inter-frame encoded data corresponding to a frame of frame data. The decoding of intra-frame encoded data is equivalent to the decoding of inter-frame encoded data shown in FIG. 4, except that the motion compensation of motion compensator 412 and the frame addition of frame adder 410 are not performed.

In particular, parser 401 of FIG. 4 separates the block data (containing the encoded motion-compensated inter-frame differences) from other bitstream data (e.g., the encoded motion vectors). Huffman decoder 402 applies statistical decoding to the encoded block data for the current frame to reconstruct the run-length encoded run/val data. Run-length decoder 404 transforms the RLE data into quantized coefficients. Inverse quantizer 406 dequantizes the quantized coefficients to generate dequantized coefficients. Inverse block transform 408 applies the inverse of forward block transform 306 of FIG. 3 to the dequantized coefficients to generate decoded inter-frame differences.

Meanwhile, motion compensator 412 applies the motion vectors for the current frame to the reference frame corresponding to a previously decoded frame to generate a motion-compensated prediction frame. Frame adder 410 adds the decoded inter-frame differences generated by inverse block transform 408 to the motion-compensated prediction frame generated by motion compensator 412 to generate the decoded frame for the current frame.

MAP filter 411 applies the same MAP filter applied by MAP filter 319 of FIG. 3 to the decoded frame to generate a filtered frame, which may also be used as a reference frame for decoding one or more other encoded video frames. Filter 411 is a loop filter because it is applied as part of the decoding loop. Those skilled in the art will understand that motion compensator 412 and frame adder 410 of FIG. 4 are equivalent to motion-compensated adder 318 of FIG. 3. MAP filter 411 is described in further detail in the next section of this specification entitled "MAP Filter."

MAP Filter

Figure 5:
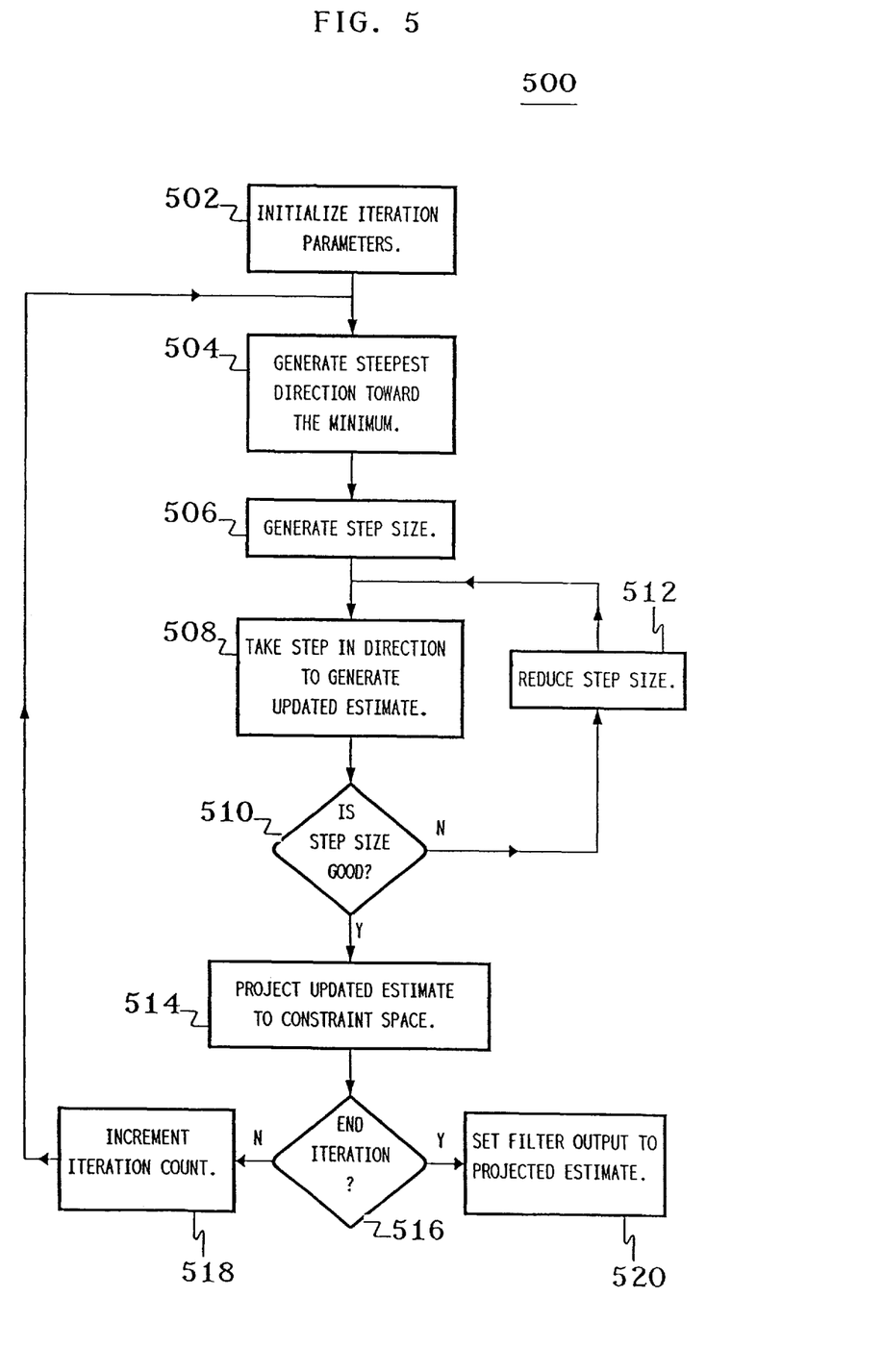
FIG. 5 is a flow diagram of the maximum a posteriori (MAP) filter of FIGS. 3 and 4.

Referring now to FIG. 5, there is shown a flow diagram of maximum a posteriori (MAP) filter 500, according to one embodiment of the present invention. In this embodiment, filter 319 of FIG. 3 applies MAP filter 500 during encode processing and filter 411 of FIG. 4 applies MAP filter 500 during decode processing. MAP filter 500 is described in detail in the IEEE paper.

The significance of a loop filter is that the results of the loop filter are used to form the reference frame used in encoding or decoding other video frames. As such, a loop filter is distinguished from a post filter, which is typically applied only during decoding and outside of the decoding loop. That is, the results of a post filter are not used to form reference frames.

As indicated in FIG. 5 and as fully described in the IEEE paper, MAP filter 500 applies an iterative approach to generating the filtered image. An initial estimate of the filtered image is improved by successive iterations until the difference between successive iteration estimates is less than a specified threshold or until an iteration count exceeds a specified maximum value. The rate of convergence of the iteration is affected by the choice of the initial estimate. A better initial estimate will result in faster convergence.

Processing for MAP filter 500 begins by initializing the filter's iteration parameters (step 502 of FIG. 5). As indicated by Equation (16) of the IEEE paper, depending on whether MAP filter 500 is implemented during encode or decode processing, the initial decompressed image estimate is the decoded frame generated by either adder 318 or adder 410. During step 502, the iteration count is also initialized to 0.

Given the current estimate, the gradient projection method is used to find the next estimate. For further description of the gradient projection method, see M. S. Bazaras, H. D. Sherall, and C. M. Shetty, *Nonlinear Programming: Theory and Algorithms*, New York: Wiley, 2nd ed., 1993, which is incorporated herein by reference. In particular, the steepest direction toward the minimum is generated (step 504), as shown in Equation (17) of the IEEE paper.

The size of the step is then generated (step 506), as shown in Equation (18) of the IEEE paper. In step 508, the estimate is then updated by stepping by the step size of step 506 in the direction of step 504, as shown in Equation (19) of the IEEE paper.

The choice of step size is based on selecting the optimal step size for a quadratic approximation to the nonquadratic function in Equation (15) of the IEEE paper. Since this is an approximation, the value of the objective function may increase if the step size is too large. The objective function may be defined as the double summation in Equation (15). A step size will be too large if using that step size causes the objective function to increase rather than decrease. In that case (step 510), the step size is divided by 2 (step 512) and the processing of step 508 is repeated with the new step size to generate a different updated estimate. Steps 508–512 are repeated until a step size is found that causes the value of objective function to decrease.

As shown in Equation (20) of the IEEE paper, the updated estimate is then projected onto the constraint space (step 514). As described on pages 493–495 of the IEEE paper, the form of the projection operator depends upon whether the quantization is scalar or vector quantization. The constraint space is the set of all images that would have compressed to the encoded bitstream. For encoding schemes that used quantization, the constraint space is dictated by the degree of quantization applied when encoding the image. Step 514 has the effect of keeping the estimate within the constraint space.

If iteration is complete (step 516), then the processing of MAP filter 500 concludes by setting the filter output to the projected estimate (step 520). The iteration will be complete if either (1) the difference between successive estimates is less than a specified threshold or (2) the iteration count reaches a specified limit (i.e., the iteration loop has been implemented a specified maximum number of times). If iteration is not complete, then the iteration count is incremented by 1 and processing returns to step 504 to repeat the iteration loop of steps 504–516 using the projected estimate as the current estimate.

Those skilled in the art will understand that the MAP filter described in the IEEE paper is just one possible implementation of the present invention. Other implementations are also within the scope of the present invention. For example, in an alternative embodiment, the testing and reducing of the step size of steps 510 and 512 may be implemented after the projection of step 514.

It will also be understood that, despite the additional computational load involved in implementing a MAP filter as a loop filter within the encoding and decoding loops, doing so may provide certain advantages over other video coding schemes. Application of a MAP filter tends to reduce artifacts that may exist in the decoded video stream, such as blockiness that can result from quantization. Moreover, using MAP filtered video data to generate the reference frames for video encoding (i.e., using the MAP filter as a loop filter during encode processing) may reduce the average magnitude of interframe differences. Smaller interframe differences implies that the overall size of the encoded bitstream may be reduced with little or no loss in video quality. Alternatively, reductions in interframe differences may be used to improve video quality with little or no increase in the size of the encoded bitstream.

Those skilled in the art will understand that the loop filtering of the present invention may be implemented in video encoding and decoding schemes that differ from those of FIGS. 3 and 4. In these alternative embodiments, certain processing blocks in FIGS. 3–4 may be skipped, additional processing blocks may be added, or both. It will also be understood by those skilled in the art that MAP filter of the present invention need not be applied as a loop filter to every frame in a video sequence. For example, disposable frames that are not themselves used as references for encoding or decoding other frames need not have the MAP filter applied as a loop filter during encode and decode processing. Note however that such frames may have the MAP filter applied as a post filter during decode processing to remove encoding artifacts such as quantization noise.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for encoding video signals, comprising the steps of:
   (a) encoding a first video image to generate a first encoded video image;
   (b) decoding the first encoded video image to generate a first decoded video image;
   (c) applying a maximum a posteriori (MAP) filter to the first decoded video image to generate a first filtered video image; and
   (d) encoding a second video image based on the first filtered video image to generate a second encoded video image.

2. The method of claim 1, wherein step (a) comprises the steps of:
   (1) applying a block transform to one or more blocks of the first video image to generate one or more transformed blocks; and
   (2) quantizing the one or more transformed blocks to generate one or more quantized blocks.

3. The method of claim 1, wherein step (c) comprises the steps of:
   (1) generating a current estimate from the first decoded video image;
   (2) generating a direction toward minimum;
   (3) generating a step size;
   (4) generating an updated estimate using the current estimate, the direction, and the step size; and
   (5) projecting the updated estimate to a constraint space to generate a projected estimate.

4. The method of claim 3, wherein steps (c)(2) to (c)(5) are repeated iteratively using the projected estimate as the current estimate.

5. The method of claim 3, wherein the step size is reduced if an objective function applied to the updated estimate does not decrease in value.

6. The method of claim 1, wherein step (c) comprises the step of applying the MAP filter iteratively to the first decoded video image to generate the first filtered video image.

7. A storage medium encoded with machine-readable computer program code for encoding video signals, wherein, when the computer program code is executed on a machine, the machine:
   (a) encodes a first video image to generate a first encoded video image;
   (b) decodes the first encoded video image to generate a first decoded video image;
   (c) applies a MAP filter to the first decoded video image to generate a first filtered video image; and
   (d) encodes a second video image based on the first filtered video image to generate a second encoded video image.

8. A method for decoding encoded video signals, comprising the steps of:
   (a) decoding a first encoded video image to generate a first decoded video image;
   (b) applying a MAP filter to the first decoded video image to generate a first filtered video image; and
   (c) decoding a second encoded video image based on the first filtered video image to generate a second decoded video image.

9. The method of claim 8, wherein step (a) comprises the steps of:
   (1) dequantizing one or more blocks of the first encoded video image to generate one or more dequantized blocks; and
   (2) applying an inverse block transform to one or more dequantized blocks to generate one or more inverse transformed blocks.

10. The method of claim 8, wherein step (b) comprises the steps of:
   (1) generating a current estimate from the first decoded video image;
   (2) generating a direction toward minimum;
   (3) generating a step size;
   (4) generating an updated estimate using the current estimate, the direction, and the step size; and
   (5) projecting the updated estimate to a constraint space to generate a projected estimate.

11. The method of claim 10, wherein steps (b)(2) to (b)(5) are repeated iteratively using the projected estimate as the current estimate.

12. The method of claim 10, wherein the step size is reduced if an objective function applied to the updated estimate does not decrease in value.

13. The method of claim 10, wherein step (b) comprises the step of applying the MAP filter iteratively to the first decoded video image to generate the first filtered video image.

14. A storage medium encoded with machine-readable computer program code for decoding video signals, wherein, when the computer program code is executed on a machine, the machine:
   (a) decodes a first encoded video image to generate a first decoded video image;
   (b) applies a MAP filter to the first decoded video image to generate a first filtered video image; and
   (c) decodes a second encoded video image based on the first filtered video image to generate a second decoded video image.

* * * * *